Aug. 12, 1969  C. E. HOLM  3,460,326
HARVESTING DEVICE FOR CELERY AND LIKE PLANTS
Filed May 27, 1966
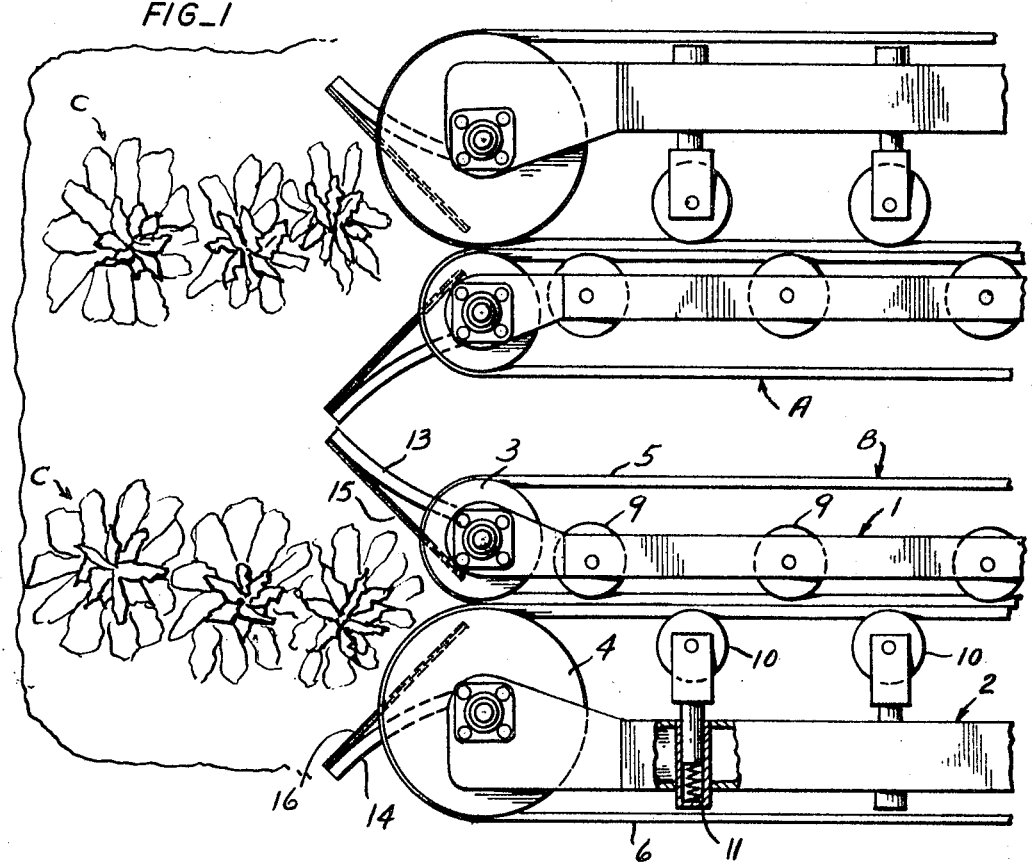
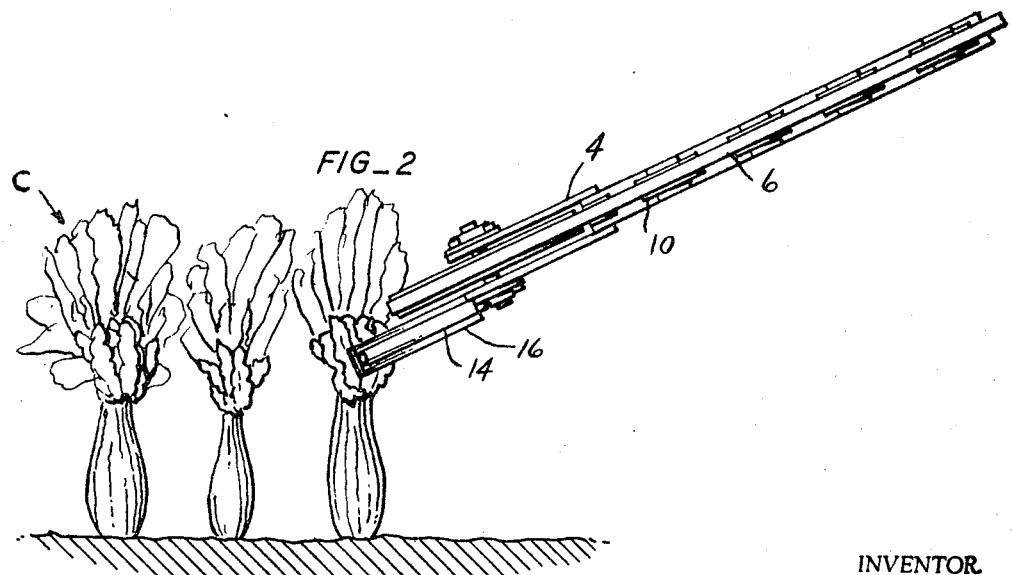
INVENTOR.
CARL E. HOLM
BY
Gordon Wood.

United States Patent Office 3,460,326
Patented Aug. 12, 1969

3,460,326
HARVESTING DEVICE FOR CELERY
AND LIKE PLANTS
Carl E. Holm, P.O. Box 2351,
Castro Valley, Calif. 94546
Filed May 27, 1966, Ser. No. 553,339
Int. Cl. A01d 89/00
U.S. Cl. 56—119      2 Claims

ABSTRACT OF THE DISCLOSURE

Flexible guides for use with a harvesting vehicle for harvesting celery and like plants. The guides are elongated flexible elements secured at points forwardly of the crop gathering point of the harvesting conveyor on the vehicle and slanting inwardly toward the gathering point to permit guiding both mature and tender stalks.

---

This invention relates to harvesting apparatus which includes a vehicle adapted to be driven along the length of plant rows and provided with means for cutting and removing plants from the ground and conveying them to a collection point such as a truck.

Numerous harvesting vehicles have been provided in the past for mechanically removing plants such as celery from the ground, gripping the stalks of such plants and conveying the stalks upwardly to a discharge point. The general method heretofore used has been to grip the stalk between opposed runs of conveyors arranged in side by side relation and moving at the same speed. Use of such a method and apparatus requires that the stalks of the plant be guided toward the gripping point in order that the operation may be carried out effectively. In this connection it will be understood that in the case of celery and like plants the stalks may be extremely leafy and of wide lateral extent so as to make it extremely difficult to feed the stalks to the gripping point to initiate the conveying step. Furthermore, the stalks of plants such as celery do not always grow exactly on the longitudinally extending central vertical plane representing the path of travel of the conveyor but in many instances the stalks are off-set from such a plane. The problem is also aggravated by the fact that the stalks of the plant are not of the same size and rigidity and, while larger and firmer stalks which are relatively rigid may be readily fed or guided to the gripping point, in many instances smaller and less mature plants having more flexible stalks are likely to be pushed forward because of their yieldability and become fouled with the next plant or plants thereby preventing adequate removal of the plants from the ground.

In analogous situations wherein this or a similar problem is presented it has been proposed to provide inwardly slanting guides in pairs converging toward the gripping point so that upon forward movement of the vehicle the upper portions and stalks of the plants are guided inwardly so as to be engageable by the harvesting apparatus. However, in the case of celery and like plants having leafy stalks such a procedure has not been effective in view of the nonuniformity in size of the plant stalks and also because of the irregularity in the position of the stalks relative to the vertical central plane of the harvesting device. The use of rigid guides forwardly of the gripping point would be effective if exact uniformity in size and positioning of the plants existed. However, as a practical matter, the use of such rigid guides fails to obtain the desired result and results in smaller plants having their stalks deflected forwardly to such an extent as to become fouled with the stalks of the succeeding plants. Also, such a rigid guide arrangement fails to achieve the lateral inward movement required in the case of off-center plants again resulting in ineffectual harvesting.

The main object of the present invention is to overcome the disadvantages of prior harvesting devices of the subject type.

Another object of the invention is the provision of an improved guide means for harvesting plants such as celery and which improved guide means is effective to guide the stalks of the plant to the gripping point regardless of irregularities in positioning of the plants and regardless of the size of the stalks of such plants.

Still another object of the invention is the provision of guide means for plant stalks which is relatively inexpensive to construct and to attach to existing or new equipment of the subject type.

Other objects and advantages will be apparent from the specification and from the drawings.

FIG. 1 is a top plan view of the forward end portion only of a harvesting vehicle incorporating the present invention.

FIG. 2 is a side elevation of the structure of FIG. 1.

In FIG. 1 two pairs of conveyors are shown and indicated at A and B respectively. These pairs of conveyors each serve to harvest the plants from a row and are identical in structure. For this reason only one conveyor will be described in detail.

Each conveyor comprises a pair of elongated frame members generally designated 1, 2 respectively which carry at their lower ends pulleys 3, 4 around which are reeved V-belts 5, 6 respectively.

Pulley 4 is substantially larger in diameter than pulley 3 since V-belt 6 on pulley 4 is driven by a driving pulley (not shown) at the opposite end of frame member 2. V-belt 5 is driven by the adjacent run of the V-belt 6 and for this reason the arc of contact on pulley 3 may be smaller than that of the larger pulley 4. The stalks of the celery C or other plant to be harvested are to be gripped between the opposed inner runs of V-belts 5, 6 and are moved along the length of frames 1, 2 to the discharge point (not shown).

Along the length of frame member 1 there are provided a plurality of fixed rotatably mounted idlers 9. Interposed between the fixed idlers 9 are a plurality of spring urged idlers 10 supported on frame 2. Each idler is urged by compression spring 11 against the inner run of V-belt 6 thus pressing the driving V-belt against the driven V-belt 5 and serving to maintain the opposed runs of the V-belts 5, 6 in tight frictional engagement at all times. It will be understood that as the stalks of the plant are gripped between the V-belts 5, 6 said stalks are moved upwardly and rearwardly of the lengths of the frames 1, 2. The knife employed to cut the stalk at ground level is omitted from the drawings for clarity.

The above described apparatus is old in the art and no claim is made thereto except in combination with the present invention.

By the present invention a pair of forwardly and downwardly extending pipe supports 13, 14 are welded to the undersides of frames 1, 2 respectively. Said supports may be of pipe bent to an arc of a circle and as shown in FIG. 1. Welded or otherwise rigidly secured to the outer ends of supports 13, 14 are inwardly and rearwardly extending guides 15, 16 respectively. As best seen in FIG. 1 the adjacent ends of such guides 15, 16 are spaced a short distance forwardly of the gripping point of the V-belts 5, 6. It will be understood that said gripping point of the V-belts is the point of tangency of the pulleys 3, 4. The free ends of guides 15, 16 are also spaced apart a few inches on opposite sides of the central vertical plane of the gripping runs of V-belts 5, 6. Each guide 15, 16 preferably comprises a pair of flat springs, preferably about 12 inches long, 1 inch wide and about $\frac{1}{32}$ of an inch thick. Such springs permit considerable deflection of the guides as they engage the stalks of the plants. However, at the same time said guides serve to urge the stalks inwardly to the gripping point despite the fact that the stalks may be off-center relative to the central vertical plane. It will also be understood that the flexibility of guides 15, 16 permits relatively slender young plants to be urged to the gripping point and not forced forwardly against the next successive plant. At the same time the guides 15, 16 when deflected by the larger more rigid stalks effectively urge the latter toward the gripping point.

It will be seen from FIG. 2 that the supporting pipes 13, 14 are substantially in alignment with the frames 1, 2 so that they are in effect rigid continuations of said frames. Similarly, the flexible guides 15, 16 are substantially coplanar with said frames and function to gather the leaves of the plant together and guide said leaves upwardly as well as inwardly toward the gripping point.

It has been found that the above described flexible guides are extremely effective in complementing the operation of the harvesting conveyors herein described. It is emphasized that unless the guides are relatively slender and therefore readily deflected the object of the mechanism cannot be achieved.

I claim:

1. In a harvesting vehicle for celery and like plants that includes a conveyor extending along an inclined path of travel slanting rearwardly and upwardly from a loading point forwardly of said vehicle and adjacent the tops of the stalks of said plants for gripping and conveying said stalks from said loading point to a discharge point, the improvement that comprises:

a pair of elongated flexible guides for guiding said stalks to said loading point, said guides being disposed on opposite sides of the vertical central plane of said path and extending at their forward ends from points spaced laterally outwardly of said plane to points adjacent but forwardly of said loading point, means fixedly securing only said forward ends of said guides relative to said vehicle to permit the rear ends of said guides to be deflected laterally outwardly by said stalks, said guides consisting of relatively slender flat springs adapted to be readily deflected by said stalks.

2. Apparatus according to claim 1 herein said guides slant rearwardly and upwardly from their fixed forward ends in substantially coplanar relationship to said path.

References Cited

UNITED STATES PATENTS

| | | | |
|---|---|---|---|
| 2,210,219 | 8/1940 | Sievers et al. | 56—119 |
| 2,352,257 | 6/1944 | Dray | 56—119 |
| 2,854,083 | 9/1958 | Wetzel | 171—61 |
| 2,981,045 | 4/1961 | Blanshine et al. | 56—119 |
| 3,366,184 | 1/1968 | Hawkins et al. | 171—61 |

ANTONIO F. GUIDA, Primary Examiner

P. A. RAZZANO, Assistant Examiner

U.S. Cl. X.R.

171—61